June 12, 1951  J. A. HARDY  2,556,999
VIBRATION DAMPER
Filed June 19, 1946
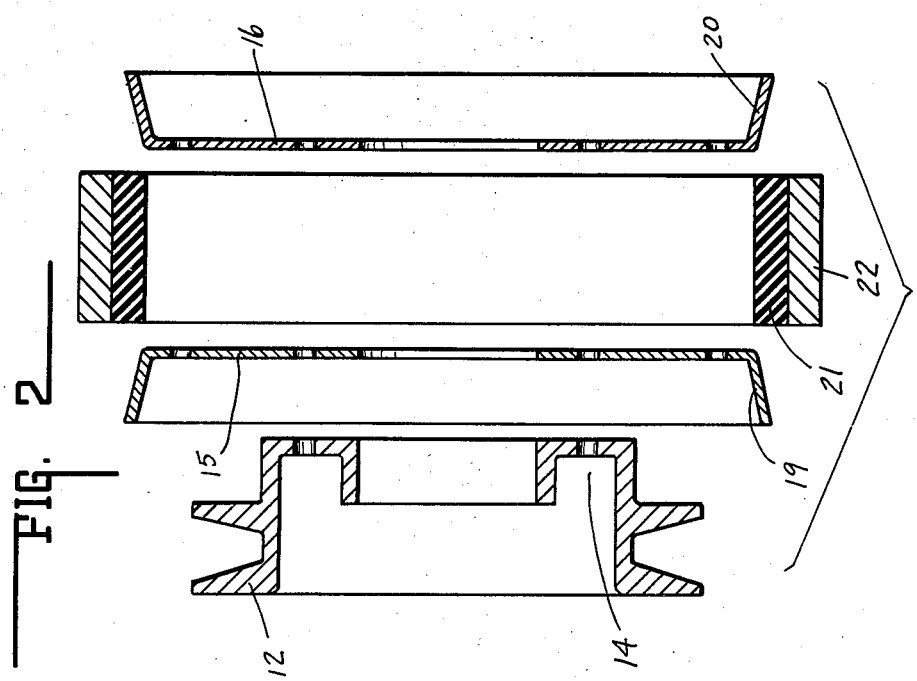
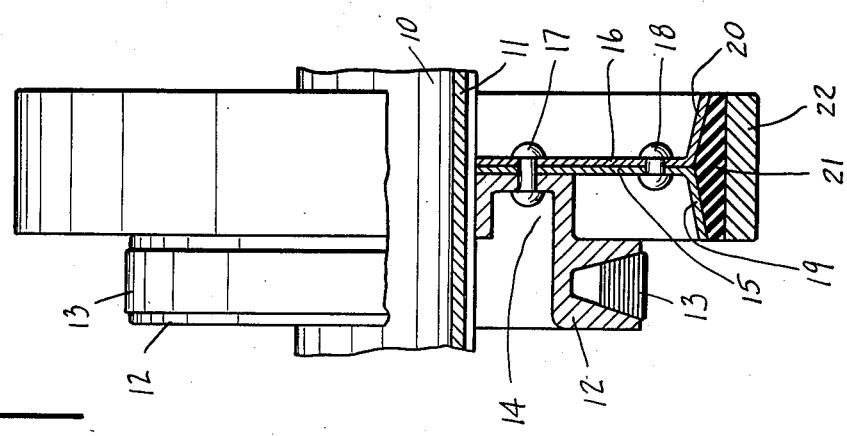
INVENTOR.
JAMES A. HARDY.
BY
Lockwood, Goldsmith & Galt,
ATTORNEYS.

Patented June 12, 1951

2,556,999

UNITED STATES PATENT OFFICE 2,556,999

VIBRATION DAMPER

James A. Hardy, Indianapolis, Ind., assignor to Schwitzer-Cummins Company, Indianapolis, Ind., a corporation Application June 19, 1946, Serial No. 677,690

1 Claim. (Cl. 74—574)

This invention relates to a vibration damper, illustrated herein as mounted on a crankshaft of an internal combustion engine, although it is adaptable to any other shaft, particularly when rotated by an internal combustion engine and subjected to torsional deflection produced by the explosive forces thereof.

The principal object of the invention consists in the structural arrangement, form and relation of the elements making up the damper for convenient and economical production and assembly, and particularly wherein the damper structure may incorporate and include a driving pulley for accessories such as the cooling fan of an engine. To this end the damper is assembled from preformed parts which may comprise sheet metal stampings, pressed and secured in assembled relation with resilient material such as rubber interposed between a supporting plate connected to the shaft and an inertia element clamped therewith. This arrangement avoids the necessity of vulcanizing or surface bonding the interposed rubber or similar resilient material as between the support and the inertia element, while at the same time obtaining the desired shearing action of the rubber or resilient material to permit relative rotational movement between the inertia element and the supporting plate of the shaft.

The full nature of the invention will be understood from the accompanying drawings and the following description and claim:

Fig. 1 shows the vibration damper in elevation in the upper half of the figure and in central vertical section in the lower half thereof.

Fig. 2 is illustrative of the preformed parts in exploded relation before assembly.

In the drawings there is shown a crankshaft 10 of an internal combustion engine upon which a sleeve 11 is secured. Supported and keyed to said sleeve there is a fan pulley 12 adapted to drive a fan belt 13 for the cooling system of the engine. The fan pulley is recessed at 14 for conveniently riveting it to a pair of radially extending supporting plates 15, 16.

The fan pulley 12 is directly supported upon the sleeve 11 which receives the full force of the thrust resulting from the driving belt 13. The hub portion of the pulley lies adjacent the inner portion of the supporting plates 15, 16, being riveted thereto at 17. Said plates are also riveted together at spaced intervals about their outer periphery, as indicated at 18.

Each of said supporting plates 15, 16 is preferably of sheet metal stamped to provide angularly disposed rim sections 19, 20, respectively. Thus, the outer faces of said rim sections are opposed to each other in angular relation to provide wedging and clamping members, as hereinafter described.

Surrounding the rim sections of the supporting plates there is mounted a band 21 of resilient material, such as rubber. Said rubber band is substantially of the width of the combined rim sections. Surrounding said rubber band and of substantially the same width, there is provided an annular inertia element 22.

The structure is such that the various parts may be preformed in disassembled relation, as shown in Fig. 2, and more particularly the annular supporting plates 15, 16 with their angularly-disposed rim sections may be stamped of sheet metal.

The above described structure is such that in assembling the preformed parts, the rubber band 21 may be inserted within the inertia element 22. The supporting plates 15, 16 are then placed on opposite sides of the band and inertia element to bear against the inner periphery thereof. Said plates are then drawn together under pressure in a manner to cause their angularly-disposed rim sections 18, 20 to wedge and compress the rubber band outwardly against the inertia element. When the plates are brought together, the rubber band will be under such compression that the surfaces thereof engaging the inertia element peripherally and the respective rim sections of the supporting plates will be held against displacement, while the resilient shearing action of the rubber band will permit relative movement between said inertia element and plates in a manner to dampen out vibrations of the shaft 11. In such compressed relationship the plates 15, 16 are riveted together and to the pulley 12.

The invention claimed is:

A vibration damper for a rotating shaft comprising an outer cylindrical inertia element having constant inner and outer diameters throughout the width thereof, a cylindrical band of resilient material mounted within said element in face to face engagement with the inner surface thereof, said band when uncompressed having a constant inner diameter throughout the width thereof, a pair of radially extending supporting plates secured about said shaft for rotation therewith each having oppositely flared rim sections of conical form, the smaller outside diameter thereof being substantially the inner diameter of said band and the greater outside diameter being substantially greater than said inner diameter and less than the outside diameter of said band, and means for securing said plates together into compressing engagement with the inner surface of said band to wedge said band against the inner surface of said inertia element with the lateral portions thereof compressed to a lesser thickness than the intermediate portion thereof.

JAMES A. HARDY.

REFERENCES CITED

The following references are of record in the file of this patent:

UNITED STATES PATENTS

| Number | Name | Date |
|---|---|---|
| 37,634 | Moreley | Feb. 10, 1863 |
| 1,840,898 | Gunn | Jan. 12, 1932 |
| 1,886,246 | Bocz | Nov. 1, 1932 |
| 1,976,789 | Lee | Oct. 16, 1934 |
| 2,161,148 | Erwood | June 6, 1939 |